Patented Oct. 14, 1947

2,429,134

UNITED STATES PATENT OFFICE 2,429,134

EXTRACTION OF DIOLEFINS

Charles E. Morrell, Westfield, and Miller W. Swaney, Cranford, N. J., assignors to Jasco, Incorporated, a corporation of Louisiana No Drawing. Application September 11, 1945, Serial No. 615,690

10 Claims. (Cl. 260—681.5)

This invention relates to improvements in the separation and concentration of diolefins from hydrocarbon mixtures containing diolefins and other hydrocarbons.

In the production of diolefins, a hydrocarbon mixture is obtained that contains mono-olefins, paraffins and other hydrocarbons together with the diolefins that have been produced. It is generally very difficult to separate the diolefins from the other hydrocarbons as the boiling range generally varies 1° or 2° C. Various methods have been proposed for the separation of the diolefins from the hydrocarbon mixtures, for example, by the use of various metallic salt absorbents, such as silver, zinc and copper, sulfur dioxide absorbents, slurries or cuprous chloride with ammonium chloride, etc. The use of these solutions have, heretofore, had several serious drawbacks, such as corrosion of steel, the instability of the absorbent, the low selectivity, low capacity, etc.

It has been found that copper salts are most efficient for the separation of diolefins. The first copper salt used was that of cuprous chloride in the form of a slurry with ammonium chloride and either hydrochloric acid or ammonia. These absorbents were difficult to handle and monoethanolamine cuprous salt solutions were then proposed. The copper salt used was that of a chloride, sulfate, nitrate or acetate but there was one disadvantage in using these absorbents and that was the tendency of the monoethanolamine cuprous salt solution to decompose. It was then proposed that pyridine cuprous salt solution be used and various combinations have been used with varying success. The cuprous salts used with pyridine were the chloride, sulfate, nitrate, acetate, lactate, tartrate, glycolate, thioglycolate, benzoate, salicylate, benzene sulfonate, phosphate, etc., but even with these combinations various drawbacks were encountered, such as the corrosion of steel. Thereafter ammoniacal cuprous salt solutions of a chloride, fluoride, sulfate, phosphate, acetate, lactate, tartrate, formate, etc. were tried. The salt preferred was that of ammoniacal cuprous acetate. All these ammoniacal solutions were prepared with cuprous copper concentrations of about one mol per liter. Also with these solutions the low capacity and the corrosion of ferrous metals used in the apparatus were found to be objectionable.

An object of this invention is to provide a stable non-corrosive absorbent that can be used in steel equipment and which will selectively separate the diolefins from the hydrocarbon mixtures containing diolefins together with other hydrocarbons, such as mono-olefins, paraffins, etc., from which solution diolefins of a 98% purity or better can be recovered.

According to this invention it has been found that basic ammoniacal cuprous solutions of high copper content, 2 to 5 mols of copper per liter, are especially suitable for diolefin extraction in steel equipment. The copper and ammonia in this solution are combined with an anion that forms a complex which is soluble in aqueous ammonia. The preferred concentration of copper is above 2 mols per liter as it has been indicated above that more dilute copper solutions are not suitable for use in steel.

The nature of this anion may vary widely. It is required only that it form a complex cuprous salt that is soluble in strong excess ammonia to the extent indicated. The anions described above are generally suitable for this purpose, provided a sufficient excess of ammonia to form a strongly basic solution is used. Some of these complexes are formed rather slowly, but may be prepared by extensive digesting of the cuprous salt with excess ammonia, or of the ammonia-ammonium salt solution with copper shot and with added oxygen or air. Examples of suitable anions include the sulfate, phosphate, acetate, lactate, tartrate, formate, borate, carbonate, chloride, fluoride, glycolate, thioglycolate, benzoate, salicylate, benzene sulfonate, orthophosphate, cyanide, thiocyanate, maleate, etc. Solutions containing mixtures of such anions may also be used. At least 2 mols per liter of the cuprous copper with a trace of cupric copper are used together with about 10.5 to 11 or more mols of ammonia and the balance water, the solution possessing a pH value of at least 9.0 and preferably above 9.5.

Heretofore, the chief drawback to the use of copper solutions in steel has been the inherent tendency of the copper ions to react with the steel equipment. Thermodynamically, both cuprous and cupric ions react with iron, as predicted from their respective positions in the electromotive series of the elements $$Cu^+, Cu^{++}+Fe \rightarrow Cu+Fe^{++}, Fe^{+++}$$

Indeed, in neutral or acidic solutions both cuprous and cupric ions attack iron vigorously.

We have found that in the strongly basic ammoniacal cuprous anion solutions (pH above 9.0 and preferably in the range of 9.5–12.5 or higher), cupric ions exert a remarkable passivity toward metallic iron, in that no reaction occurs between $Cu^{++}$ and Fe. Furthermore, this pronounced passivating effect of cupric ions is sufficient to completely prevent any reaction between cuprous ions ($Cu^+$) and metallic iron or steel, whereas in the absence of traces of $Cu^{++}$, even in these strongly basic solutions, cuprous ions react vigorously with steel. We have found that almost immeasurably small quantities of cupric copper are capable of stabilizing these solutions.

For example, ammoniacal cuprous acetate solutions of low copper content are easily reduced to the extremely corrosive 100% cuprous state, and are, therefore, not suitable for use in steel equipment. On the other hand, we have discovered that in solutions of high copper content (2 to 5 mols of copper per liter) the $Cu^+ \rightleftarrows Cu^{++}$ equilibrium is such that it is not possible to completely reduce all the cupric ions to cuprous by heating with metallic copper. These high copper content solutions are therefore extremely stable in steel equipment even at very high temperatures. The further advantages of these high copper content ammoniacal cuprous acetate solutions are illustrated by the later examples.

Another advantage in using the high copper ammoniacal cuprous acetate solution is in the high absorption capacity for butadiene and improved butadiene selectivities over those solutions of low copper content. The preferred solution contains about 3.2 mols of copper of which the cuprous content is 3.0 mols, the cupric content 0.2 mol and the total ammonia 10.5 to 11.0 mols, acetic acid 4 mols and the balance water, and possesses a pH value of about 10.5 to 12.5. This is illustrated by the following table:

TABLE

*Extraction of butadiene-butene-2 mixtures with 3.0 M.$Cu^+$ ammoniacal cuprous acetate solution*

| Temperature of Extraction | Per cent Butadiene in Residual $C_4$ Phase | Volumes Gaseous $C_4$ Desorbed/ Vol. of Copper Solution | Per cent Butadiene in Desorbed Gas |
|---|---|---|---|
| −5° C | 12.5 | 12.5 | 90.9 |
| −5° C | 30.6 | 19.1 | 94.0 |
| −5° C | 50.4 | 23.8 | 96.9 |
| −5° C | 100 | 28.7 | 100 |

The high-copper ammoniacal cuprous acetate solutions are generally preferred due to their low viscosity, but ammoniacal cuprous lactate solutions have likewise been used, for example, a solution containing 3.44 mols of copper (90% cuprous), 8.0 mols ammonia, 3.8 mols ammonium lactate. There were also prepared ammoniacal lactate solutions having a copper content of about 4.5 to 5 mols of copper (90% cuprous), 8.0 to 9.0 mols of ammonia and 7.0 to 8.0 mols of ammonium lactate.

An ammoniacal cuprous tartrate solution was likewise used, one containing 4.78 mols of copper (about 90% cuprous), 8.0 mols of ammonia and 8.0 mols of ammonium tartrate.

In carrying out this process it was found advisable to use three absorption towers in which the ammoniacal cuprous salt solution containing about 3.2 mols of copper is passed in countercurrent flow to the hydrocarbon mixture which may be in a gas or liquid phase. It is not necessary to use packed towers as other towers may be used. Where towers are used the ammoniacal cuprous salt solution separated therefrom is found to contain diolefins of about 90% purity. These are then separated and partially desorbed of about 20% of the diolefins and residual diolefins of about 98% concentration may be obtained by further heating. The diolefins first obtained are recycled to the absorber.

Turbo mixers may likewise be used, that is, the hydrocarbon mixture and the ammoniacal cuprous salt solution are introduced into the turbo mixers where by means of the turbulence of the two an intimate contact of the hydrocarbon mixture and the ammoniacal cuprous salt solution is obtained. This mixture is then allowed to pass to a settling chamber and the two layers that form are separated. The ammoniacal cuprous salt solution is passed to the next turbo mixer to contact some more of the hydrocarbon mixture while the hydrocarbon mixture layer is passed to another turbo mixer until three or more contacts are obtained. The spent hydrocarbon mixture is removed to storage and the ammoniacal cuprous salt solution with the diolefin solution is passed to a desorber. The ammoniacal cuprous salt solution here contains a diolefin of at least 90% purity and when the ammoniacal cuprous salt solution is partly desorbed, that is, about 20% of the diolefins removed, in a pre-flashing step, it is found that the balance of the diolefins have a purity of at least 98%. The first fraction of the diolefins that are removed may be recycled to the absorber. The ammoniacal cuprous salt solution containing diolefins of 98% concentration may then be subjected to further heat (70°–80° C.) to recover the balance of the diolefins. The diolefin is then washed with water or otherwise purified to remove the last traces of ammonia. Since the ammoniacal cuprous salt solution, by coming in contact with traces of air in the $C_4$ feed, is partly and slowly oxidized toward the cupric state, it is then passed through a tower containing metallic copper before being returned to the absorber for recycle with fresh $C_4$ feed. This circulation through metallic copper helps keep the copper solution in a high cuprous state and maintain its high capacity for diolefins. Nevertheless, the preferred high copper content solutions can be circulated over copper in steel equipment in this manner without any trouble of any kind from corrosion or instability as would be encountered with low copper content solutions.

The following examples indicate some advantages over more dilute solutions of certain preferred embodiments of this invention, but it is to be understood that the invention is not to be limited to these specific examples, which are presented only as illustrations of the broad class of ammoniacal cuprous salt solutions which may be used according to this invention:

EXAMPLE 1

An ammoniacal cuprous acetate solution of 3.9 copper molarity and a cuprous content of 91% was sealed in a glass tube containing a polished strip of mild steel. After being heated at 215° F. for 7 days, both the test strip and the copper solution were in excellent condition, neither showing any signs of deterioration or corrosion.

EXAMPLE 2

An ammoniacal cuprous acetate solution of 3.1 M. $Cu^+$ and 0.1 M. $Cu^{++}$ contents was sealed in a glass tube with steel wool and copper wool. This was then heated at 215° F. for several days. During this time the solution remained completely stable, did not attack the steel in any way, and no copper plating occurred. At the end of this time the solution was still of 0.1 M. $Cu^{++}$ content and possessed a definite blue color due to the presence of some cupric copper.

EXAMPLE 3

An ammoniacal cuprous acetate solution of 0.9 M. $Cu^+$ content and about 0.1 M. $Cu^{++}$ content and substantially the same pH as the solutions described in Examples 1 and 2 was heated with steel and copper wools as in the preceding example. After a relatively short time the solution became colorless (100% cuprous state was reached) whereupon the steel was vigorously attacked, and in a few minutes all the copper had plated on the steel, accompanied by a dissolution of the latter.

EXAMPLE 4

A non-corrosive ammonium cuprous lactate absorbent solution was prepared by heating in a closed flask, at about 70° C., the following mixture: 30.3 grams concentration of 28% aqueous ammonia, 80 grams ammonium lactate, 100 grams $H_2O$, 25 grams cuprous oxide ($Cu_2O$) and some shredded copper.

When the solution was complete a sample was analyzed and found to contain 3.25 mols per liter of total copper, of which 0.368 was cupric, the remainder being in the form of cuprous.

EXAMPLE 5

A non-corrosive ammoniacal cuprous tartrate absorbent solution was prepared by heating the following mixture in a closed flask on a water bath at about 70° C. until solution occurred: 84.8 grams concentration (28%) aqueous $NH_3$, 110.5 grams ammonium tartrate, 200 ml. $H_2O$, 50 grams $Cu_2O$, and some shredded copper.

Analysis of a sample of the final solution showed a total copper content of 4.04 mols per liter, of which about 90% was in the cuprous form.

EXAMPLE 6

In order to demonstrate the superior absorption characteristics of the high copper content solutions over those of low copper content, the following runs are cited:

An ammoniacal cuprous acetate solution of about 3.4 M. $Cu^+$ content was contacted at 0° C. with a $C_4$ cut containing 25% butadiene and 75% butenes-2. When the copper solution was desorbed by heating to 60°–70° C., 22 volumes of $C_4$ gas were obtained for each volume of copper solution heated. The purity of the desorbed gas was 93% butadiene.

In a similar experiment a low copper content solution (1.7 molal copper, 90% cuprous) was contacted at 10° C. with a 20% butadiene gas and subsequently desorbed to give only 4–5 volumes of gas of only 83% butadiene content.

Other non-corrosive cuprous solutions, suitable for absorbents for diolefins, may be prepared as follows: Cuprous sulfate and ammonia, having a cuprous content of 2.2 mols per liter and 14 mols of ammonia; cuprous propionate and ammonia, having a cuprous content of 2.2 mols per liter and 11 mols of ammonia; cuprous formate and ammonia, having a cuprous content of 2.4 mols per liter and 13 mols per liter of ammonia; ammoniacal cuprous fluoride having 4 mols per liter of fluoride, 2.5 mols per liter of cuprous copper, trace of cupric copper, and 11 mols per liter of ammonia. Ammoniacal cuprous glycolate, thioglycolate, salicylate, benzene sulfonate, phosphate, carbonate, cyanide, thiocyanate, maleate, etc., having a cuprous content of 2 mols per liter, may also be used according to this invention.

This is a continuation-in-part of U. S. patent application, Serial No. 431,564, filed February 19, 1942.

We claim:

1. Improvements in the separation and concentration of a diolefin from a hydrocarbon mixture of diolefin and relatively more saturated hydrocarbons which comprises contacting said hydrocarbon mixture with a strongly basic ammoniacal cuprous salt solution having a pH value above 9.0, containing at least 2 mols per liter of cuprous copper, a cupric content of at least a trace, ammonia and an anion that forms a cuprous salt soluble in the ammoniacal solution, separating the resulting cuprous salt solution containing absorbed diolefin from undissolved relatively more saturated hydrocarbons, and recovering the absorbed diolefin from said solution.

2. Improvements in the separation and concentration of butadiene from a hydrocarbon mixture of butadiene and relatively more saturated hydrocarbons which comprises contacting said hydrocarbon mixture with a strongly basic ammoniacal cuprous salt solution having a pH value above 9.5, containing at least 2 mols per liter of cuprous copper, a cupric content of at least a trace, ammonia and an anion that forms a cuprous salt soluble in the ammoniacal solution, separating the resulting cuprous salt solution containing absorbed butadiene from undissolved relatively more saturated hydrocarbons, and recovering the absorbed butadiene from said solution.

3. Improvements in the separation and concentration of butadiene which comprises contacting a hydrocarbon mixture containing butadiene and relatively more saturated hydrocarbons with an aqueous strongly basic ammoniacal cuprous salt solution having a pH value of 10.5 to 12.5, containing at least 2 mols per liter of cuprous copper, a cupric content of at least a trace, ammonia and an anion that forms a cuprous salt soluble in the ammoniacal solution, separating the resulting cuprous salt solution containing absorbed butadiene from undissolved relatively more saturated hydrocarbons, and recovering the absorbed butadiene from said solution.

4. Improvements in the separation and concentration of a diolefin from a hydrocarbon mixture of diolefin and relatively more saturated hydrocarbons which comprises contacting said hydrocarbon mixture with a strongly basic ammoniacal cuprous solution having a pH value ranging from 9 to 12.5, containing at least 2 mols per liter of cuprous copper, a cupric content of at least a trace, ammonia and an anion of an organic carboxylic acid that forms a cuprous salt solution in the ammoniacal solution, separating the resulting cuprous salt solution containing absorbed diolefin from undissolved relatively more saturated hydrocarbons, and recovering the absorbed diolefin from said solution.

5. Process according to claim 4, in which said acid is acetic acid.

6. Process according to claim 4, in which said acid is lactic acid.

7. Process according to claim 4, in which said acid is formic acid.

8. Improvements in the separation and concentration of diolefins which comprises contacting a hydrocarbon mixture containing diolefins, monoolefins and paraffins with an ammoniacal cuprous acetate solution containing 3.2 mols of copper of which the cuprous content is 3 mols and the cupric content 0.2 mol, total ammonia 10.5 to 11.0 mols, acetic acid 4 mols and the balance water, having a pH value of about 10.5 to 12.5, separating the ammoniacal cuprous acetate solution from undissolved monoolefins and paraffins and heating to a temperature sufficient to expel 20% of the dissolved hydrocarbons, separating the said expelled fraction and heating the remaining ammoniacal cuprous acetate solution further to obtain a diolefin having a concentration of about 98%.

9. Improvements in the separation and concentration of butadiene from hydrocarbon mixtures containing butadiene and butene-2 which comprises contacting said hydrocarbon mixture at a temperature of about −5° C. with a strongly basic ammoniacal cuprous acetate solution having a pH value of at least 9, containing at least 2 mols per liter of cuprous copper, and at least a trace of cupric copper, separating the ammoniacal cuprous acetate solution from undissolved hydrocarbons, and heating to a temperature ranging from 70° C. to about 80° C. to recover butadiene of increased purity.

10. Improvements in the separation and concentration of olefins from hydrocarbon mixtures containing olefins and relatively more saturated hydrocarbons of similar boiling range which comprises contacting said hydrocarbon mixture with a strongly basic ammoniacal cuprous solution having a pH value ranging from 9 to 12.5, containing at least 2 mols per liter of cuprous copper, at least a trace of cupric copper, ammonia and an anion that forms a cuprous salt soluble in the ammoniacal solution, separating the resulting solution containing absorbed olefin from undissolved relatively more saturated hydrocarbons and recovering the absorbed olefinic hydrocarbons from said solution.

CHARLES E. MORRELL.
MILLER W. SWANEY.

REFERENCES CITED

The following references are of record in the file of this patent:

UNITED STATES PATENTS

| Number | Name | Date |
|---|---|---|
| 2,384,329 | Morrell et al. | Sept. 4, 1945 |
| 2,388,928 | Morrell et al. | Nov. 13, 1945 |